(12) United States Patent
Oguchi (10) Patent No.: US 11,188,444 B2
(45) Date of Patent: Nov. 30, 2021

(54) ABNORMALITY DETECTION METHOD AND ABNORMALITY DETECTION DEVICE

(71) Applicant: FUJITSU LIMITED, Kawasaki (JP)

(72) Inventor: Naoki Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/793,016

(22) Filed: Feb. 18, 2020

(65) Prior Publication Data
US 2020/0272551 A1  Aug. 27, 2020

(30) Foreign Application Priority Data

Feb. 26, 2019 (JP) .............................. JP2019-032838

(51) Int. Cl.
| | |
|---|---|
| G06F 11/00 | (2006.01) |
| G06F 11/34 | (2006.01) |
| G06F 11/32 | (2006.01) |
| G06F 16/17 | (2019.01) |
| G06F 11/07 | (2006.01) |
| G06F 16/22 | (2019.01) |
| G06F 11/30 | (2006.01) |

(52) U.S. Cl.
CPC ...... *G06F 11/3476* (2013.01); *G06F 11/0757* (2013.01); *G06F 11/3075* (2013.01); *G06F 11/327* (2013.01); *G06F 16/1734* (2019.01); *G06F 16/2282* (2019.01)

(58) Field of Classification Search
CPC ............. G06F 11/0757; G06F 11/3476; G06F 11/0709; G06F 11/0751; G06F 11/0766; G06F 11/079
See application file for complete search history.

(56) References Cited

U.S. PATENT DOCUMENTS

| | | | |
|---|---|---|---|
| 6,625,659 B1 | 9/2003 | Aramizu et al. | |
| 10,009,261 B2* | 6/2018 | Zhang | ............... H04L 45/745 |
| 10,057,166 B2 | 8/2018 | Horn et al. | |
| 2013/0003729 A1* | 1/2013 | Raman | ............ H04L 12/6418 |
| | | | 370/389 |
| 2013/0046882 A1* | 2/2013 | Takashima | ............ H04L 45/38 |
| | | | 709/224 |
| 2018/0217914 A1 | 8/2018 | Sawada et al. | |

FOREIGN PATENT DOCUMENTS

| | | |
|---|---|---|
| JP | 2000-209271 A | 7/2000 |
| JP | 2018-46549 A | 3/2018 |
| JP | 2018-124696 A | 8/2018 |

\* cited by examiner

*Primary Examiner* — Charles Ehne
(74) *Attorney, Agent, or Firm* — Fujitsu Patent Center (57) ABSTRACT

A non-transitory computer-readable recording medium stores therein a program that causes a computer to execute a process, the process comprising: acquiring update information of forwarding tables and event logs for respective relay devices at predetermined intervals; performing consistency determination of determining consistency of the forwarding tables when update completion of the forwarding tables have been confirmed for all of the relay devices; when a first relay device is determined to have a problem in consistency, associating the problem with an event log, among the event logs of the first relay device, corresponding to a time when update information of a first forwarding table of the first relay device is acquired; and outputting information including the first relay device and the event log associated with the problem.

6 Claims, 10 Drawing Sheets

| NODE NAME | NODE IP | DESTINATION | NEXT HOP | OUTPUT IF |
|---|---|---|---|---|
| L3 SWITCH A | 192.168.200.1 | 192.168.10.0/24 | Directory connected | eth0/15 |
| L3 SWITCH A | 192.168.200.1 | 192.168.20.0/24 | Directory connected | eth0/13 |
| L3 SWITCH A | 192.168.200.1 | 192.168.30.0/24 | Directory connected | eth0/14 |
| L3 SWITCH A | 192.168.200.1 | 192.168.40.0/24 | 192.168.200.2 | eth1/3 |
| L3 SWITCH A | 192.168.200.1 | 192.168.50.0/24 | 192.168.200.2 | eth1/3 |
| L3 SWITCH A | 192.168.200.1 | 192.168.60.0/24 | 192.168.200.2 | eth1/3 |
| L3 SWITCH A | 192.168.200.1 | 192.168.70.0/24 | 192.168.200.3 | eth1/3 |
| L3 SWITCH A | 192.168.200.1 | 192.168.80.0/24 | 192.168.200.3 | eth1/3 |
| L3 SWITCH A | 192.168.200.1 | 192.168.90.0/24 | 192.168.200.3 | eth1/3 |
| L3 SWITCH A | 192.168.200.1 | 192.168.100.0/24 | 192.168.200.3 | eth1/3 |
| L3 SWITCH A | 192.168.200.1 | 192.168.110.0/24 | 192.168.200.3 | eth1/3 |
| L3 SWITCH A | 192.168.200.1 | 192.168.120.0/24 | 192.168.200.3 | eth1/3 |

FIG. 7

| TIME STAMP | NODE NAME | CONTENTS |
|---|---|---|
| 2018-11-25 08:30:01 | ROUTER F | INTERFACE DOWN DETECTION (eth0/15) |
| 2018-11-25 09:00:25 | L3 SWITCH A | ROUTE IS CHANGED BY CLI |
| 2018-11-25 09:00:28 | ROUTER E | REACHABILITY WITH SWITCH A IS LOST |
| 2018-11-25 09:01:10 | L3 SWITCH C | INTERFACE DOWN DETECTION (eth0/3) |
| 2018-11-25 09:05:03 | L3 SWITCH D | ROUTE INFORMATION (DYNAMIC) IS UPDATED |
| 2018-11-25 09:07:35 | L3 SWITCH B | INTERFACE DOWN DETECTION (eth2/5) |
| 2018-11-25 09:08:15 | L3 SWITCH C | INTERFACE DOWN DETECTION (eth4/1) |

FIG. 8

| No. | DETERMINATION TIME | DETERMINATION RESULT | FIB ACQUISITION START TIME | FIB ACQUISITION END TIME | SUSPENSION TIME [$T_n$] | AVERAGE WAITING TIME [$T_{ave}$] |
|---|---|---|---|---|---|---|
| 1 | 2018-11-25 08:30:01 | OK | 2018-11-25 08:28:01 | 2018-11-25 08:29:01 | 60 | 75 |
| 2 | 2018-11-25 08:40:27 | OK | 2018-11-25 08:38:01 | 2018-11-25 08:40:01 | 120 | 90 |
| 3 | 2018-11-25 08:53:16 | OK | 2018-11-25 08:52:01 | 2018-11-25 08:53:01 | 60 | 90 |
| 4 | 2018-11-25 08:57:45 | OK | 2018-11-25 08:55:31 | 2018-11-25 08:57:31 | 120 | 90 |
| 5 | 2018-11-25 09:00:30 | NG | 2018-11-25 08:58:15 | 2018-11-25 09:00:15 | 120 | 120 |

FIG. 9A

NETWORK ABNORMALITY LOG

| | TIME | CONTENTS | | |
|---|---|---|---|---|
| 1 | 2018-11-25 09:00:30 | NW inconsistency detected | | |

FIG. 9B

EVENT LOG

| TIME STAMP | NODE NAME | CONTENTS | RELATION |
|---|---|---|---|
| 2018-11-25 08:30:01 | ROUTER F | INTERFACE DOWN DETECTION (eth0/15) | |
| 2018-11-25 08:58:25 | L3 SWITCH A | ROUTE IS CHANGED BY CLI | 1 |
| 2018-11-25 09:00:10 | ROUTER E | REACHABILITY WITH SWITCH A IS LOST | 1 |
| 2018-11-25 09:01:10 | L3 SWITCH C | INTERFACE DOWN DETECTION (eth0/3) | |
| 2018-11-25 09:05:03 | L3 SWITCH D | ROUTE INFORMATION (DYNAMIC) IS UPDATED | |
| 2018-11-25 09:07:35 | L3 SWITCH B | INTERFACE DOWN DETECTION (eth2/5) | |
| 2018-11-25 09:08:15 | L3 SWITCH C | INTERFACE DOWN DETECTION (eth4/1) | |

ABNORMALITY DETECTION METHOD AND ABNORMALITY DETECTION DEVICE

CROSS-REFERENCE TO RELATED APPLICATION

This application is based upon and claims the benefit of the prior Japanese Patent Application No. 2019-032838, filed on Feb. 26, 2019, the entire contents of which are incorporated herein by reference.

FIELD

The embodiments discussed herein are related to an abnormality detection method and an abnormality detection device.

BACKGROUND

In a system in which a plurality of devices is coupled via a network, a system failure may occur due to, for example, a communication failure. When the system failure occurs, a business dependent on the system is stopped, and thus, a business loss may occur.

Accordingly, a technology for quickly restoring a communication when a communication failure occurs has been developed. For example, there is a router device that switches to a routing table in which old route information is stored and continues an operation when a communication failure caused by a routing table occurs, and then investigates the cause of the communication failure by comparing route information before and after the switching.

Further, there is an information processing apparatus that provides a function that makes it possible to easily identify an occurrence factor, from a large amount of logs. The information processing apparatus extracts one or a plurality of event logs corresponding to events that have occurred due to the same factor from collected event logs, and identifies an event log that represents the events caused by the same factor among the extracted one or more event logs. Then, the information processing apparatus separately outputs the event log that represents the events that have occurred due to the same factor and other event logs corresponding to the events that have occurred due to the same factor.

Related techniques are disclosed in, for example, Japanese Laid-open Patent Publication No. 2000-209271 and Japanese Laid-open Patent Publication No. 2018-124696.

SUMMARY

According to an aspect of the embodiments, a non-transitory computer-readable recording medium stores therein a program that causes a computer to execute a process, the process comprising: acquiring update information of forwarding tables and event logs for respective relay devices at predetermined intervals; performing consistency determination of determining consistency of the forwarding tables when update completion of the forwarding tables have been confirmed for all of the relay devices; when a first relay device is determined to have a problem in consistency, associating the problem with an event log, among the event logs of the first relay device, corresponding to a time when update information of a first forwarding table of the first relay device is acquired; and outputting information including the first relay device and the event log associated with the problem.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In many cases, a system failure caused by a network failure is detected only when a service provided by a system is stopped. Thus, since a time elapses from the occurrence of a failure cause to the failure detection, logs become vast, and as a result, a problem may occur in that it takes time to identify a failure cause log.

Hereinafter, an embodiment of the present disclosure will be described in detail with reference to the accompanying drawings. In addition, the embodiment does not limit the disclosed technology.

Embodiment

Figure 1:
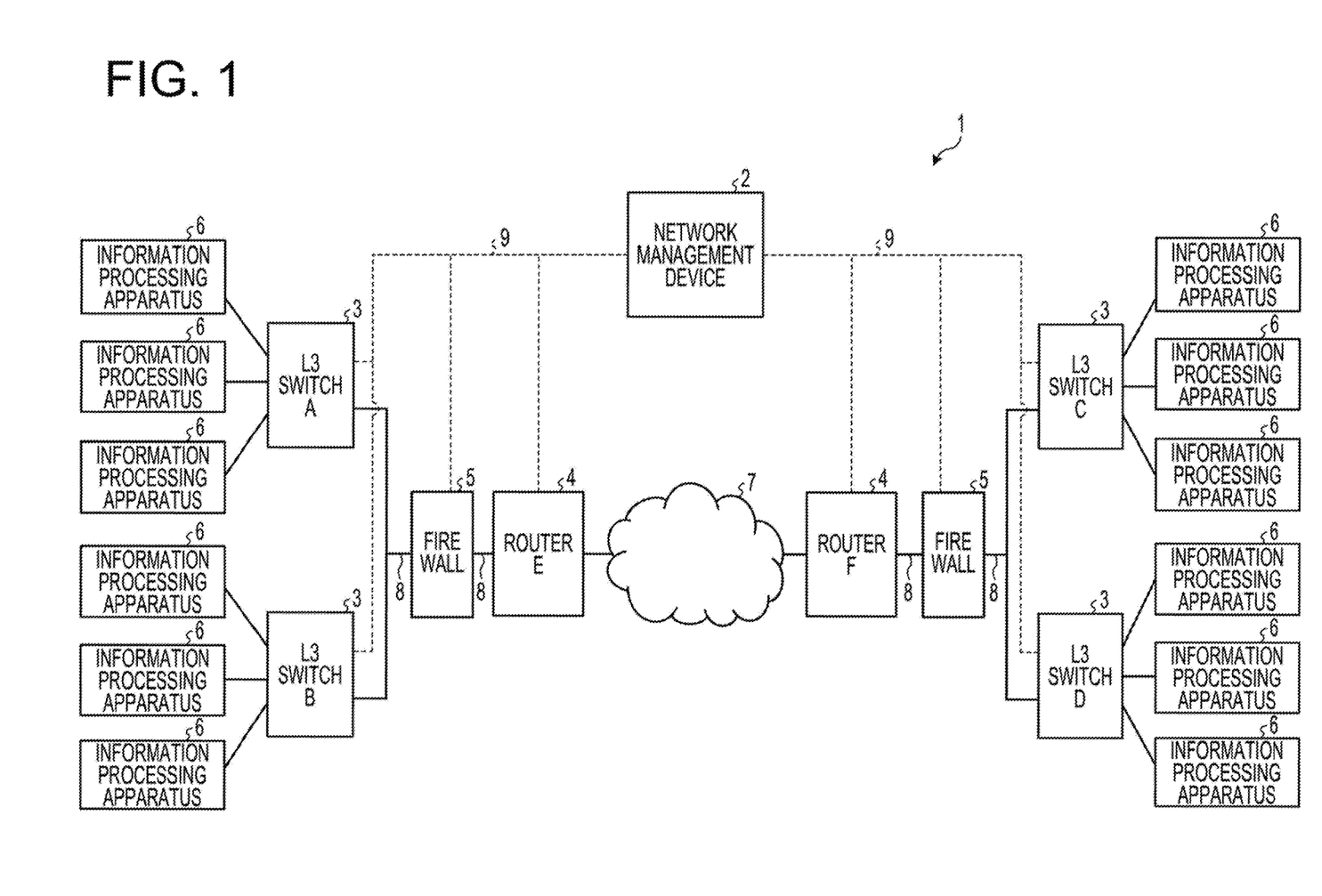
FIG. 1 is a view illustrating a configuration of a network system according to an embodiment.

The configuration of a network system according to the embodiment will be described first. FIG. 1 is a view illustrating a configuration of the network system according to the embodiment. As illustrated in FIG. 1, the network system 1 according to the embodiment includes a network management device 2, four L3 switches 3 represented by an L3 switch A to an L3 switch D, two routers 4 represented by a router E and a router F, and two fire walls 5. The network system 1 according to the embodiment includes 12 information processing apparatuses 6.

The network management device 2 manages the network system 1. The L3 switch 3 is a relay device that is directly connected to the information processing apparatus 6 and relays the communication of the information processing apparatus 6. The router 4 is a relay device that relays communications between the Internet 7 and an internal network 8. The fire wall 5 is a device that blocks an unauthorized access from the outside. The information processing apparatus 6 is a device that performs an information processing.

The L3 switch A and the L3 switch B are coupled to each other via the internal network 8. The L3 switch C and the L3 switch D are coupled to each other via the internal network 8. The L3 switch 3 is coupled to the fire wall 5 via the internal network 8. The fire wall 5 is coupled to the router 4 via the internal network 8. The network management device 2 is coupled to the L3 switch 3, the router 4, and the fire wall 5 via a management network 9.

The network system 1 may have any number of routers 4 and fire walls 5 instead of two routers 4 and two fire walls 5. The network system 1 may have any number of L3 switches 3 instead of four L3 switches 3. The network system 1 may have any number of information processing apparatuses 6, instead of 12 information processing apparatuses 6.

The network management device 2 acquires event logs related to an operation by a manager and event logs related to a failure, from the relay devices, that is, the L3 switch 3 and the router 4. The network management device 2 acquires update information of the forwarding information base (FIB) from the relay devices. Here, the FIB is a routing table referenced by hardware.

The network management device 2 determines the consistency of FIB information, and when it is determined that there is no consistency, the network management device 2 identifies an event log at a timing corresponding to an update time of the FIB, as a failure cause event log. Among failures occurring in the network, many failures are caused by setting errors. Therefore, the network management device 2 determines the consistency of the FIB information at a regular cycle in order to identify a failure caused by a setting error of the FIB. Then, when it is determined that there is no consistency in the FIB information, the network management device 2 identifies a failure cause event log by identifying an event log at a timing corresponding to the update time of the FIB.

A technology of determining the consistency of the FIB information is described in U.S. patent Ser. No. 10/057,166. In this technology, the FIB information is logically verified to determine the consistency, and when there is no consistency, a relay device having no consistency is identified.

Figure 2:
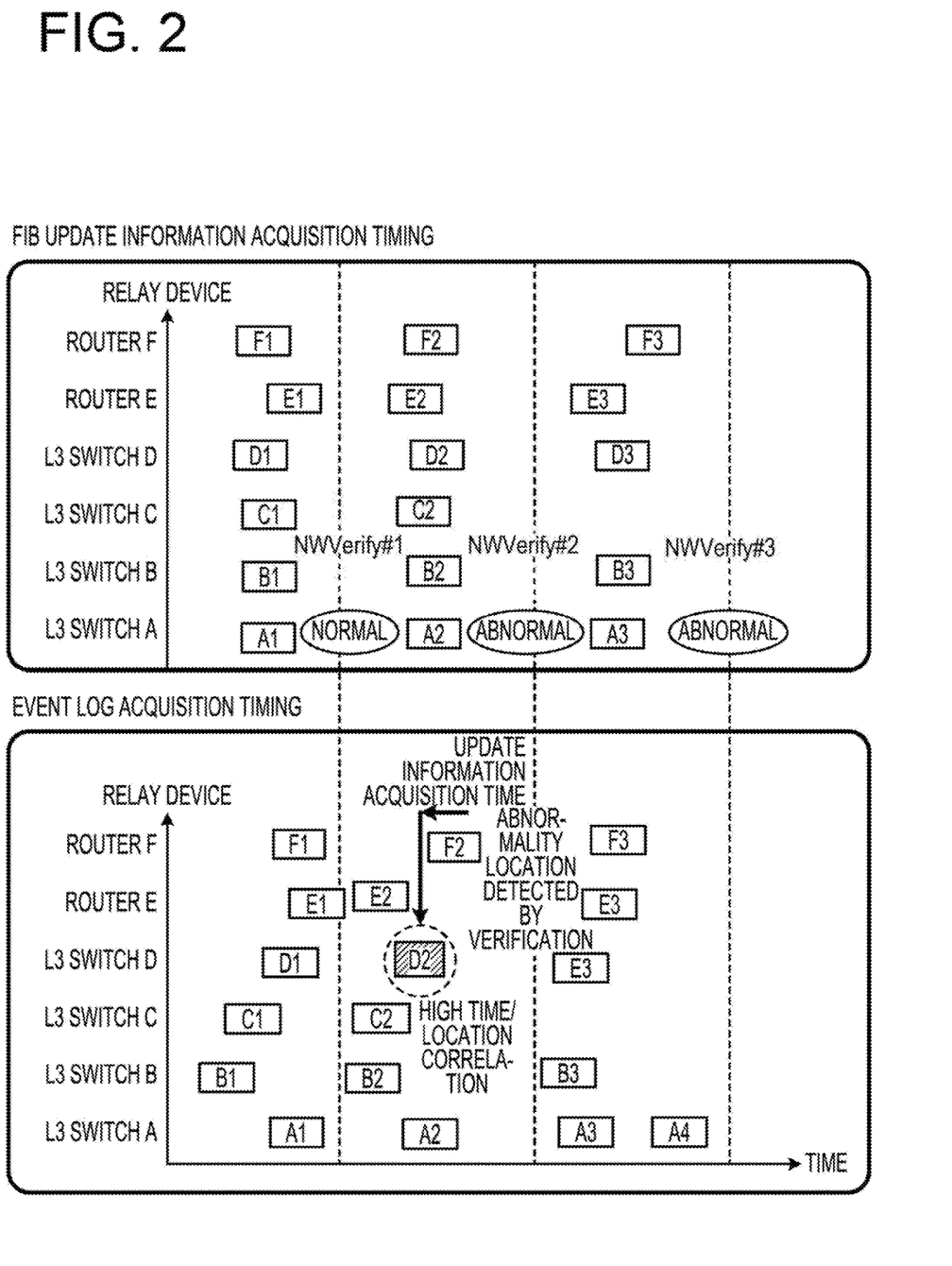
FIG. 2 is a view for explaining identifying of an event log at a timing corresponding to the update time of the forwarding information base (FIB)

FIG. 2 is a view for explaining identifying of an event log at a timing corresponding to the update time of the FIB. In FIG. 2, the upper side chart illustrates an acquisition timing of FIB update information, and the lower side chart illustrates an acquisition timing of an event log. In FIG. 2, the vertical axis indicates a relay device, and the horizontal axis indicates a time. The network management device 2 acquires difference information before and after update, as the FIB update information.

In the upper side chart of FIG. 2, "A1," "A2," and "A3" indicate acquisition timings of FIB update information from the L3 switch A, and "B1," "B2," and "B3" Indicate acquisition timings of FIB update information from the L3 switch B. Likewise, "C1" and "C2" indicate acquisition timings of FIB update information from the L3 switch C, and "D1," "D2," and "D3" indicate acquisition timings of FIB update information from the L3 switch D. Further, "E1," "E2," and "E3" indicate acquisition timings of FIB update information from the router E, and "F1," "F2," and "F3" indicate acquisition timings of FIB update information from the router F.

"NWverify #1," "NWverify #2," and "NWverify #3" indicate timings at which whether the FIB information is consistent is determined.

In the lower side chart of FIG. 2, "A1," "A2," "A3," and "A4" indicate acquisition timings of event logs from the L3 switch A. Likewise, "B1," "B2," and "B3" indicate acquisition timings of event logs from the L3 switch B. Further, "C1" and "C2" indicate acquisition timings of event logs from the L3 switch C, and "D1," "D2," and "D3" Indicate acquisition timings of event logs from the L3 switch D. Further, "E1," "E2," and "E3" indicate acquisition timings of event logs from the router E, and "F1," "F2," and "F3" indicate acquisition timings of event logs from the router F.

As illustrated in the upper side chart of FIG. 2, at the timing of "NWverify #1," the network management device 2 determines that the FIB information is consistent (the verification result is "normal"). Meanwhile, at the timing of "NWverify #2," the network management device 2 determines that the FIB information is not consistent, and the L3 switch D is abnormal (the verification result is "abnormal").

Then, the network management device 2 identifies a time range where the inconsistent FIB information is acquired, on the basis of the acquisition timing illustrated in the upper side chart of FIG. 2. Then, the network management device 2 identifies an event log output by an abnormal relay device in the identified time range, as a failure cause event log, on the basis of the acquisition timing illustrated in the lower side chart of FIG. 2. In the lower side chart of FIG. 2, "D2" is identified as the failure cause event log, from the time range where the FIB information that does not have consistency is acquired, and the L3 switch D as an abnormal location.

Figure 3A:
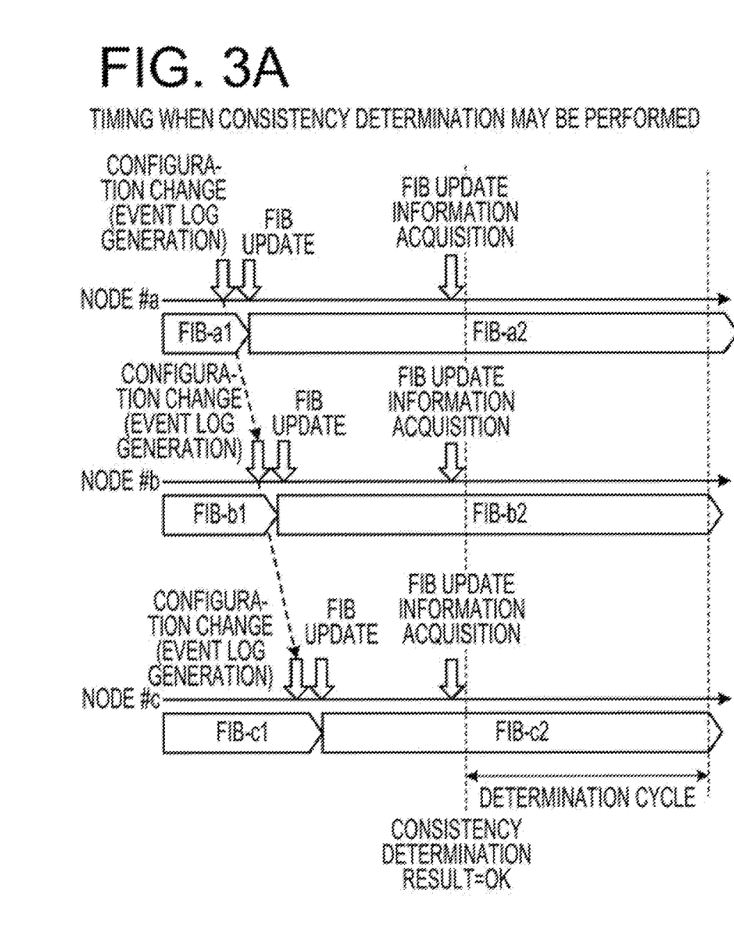
FIGS. 3A and 3B are views for explaining a timing when consistency determination of FIB information may not be performed.
Figure 3B:
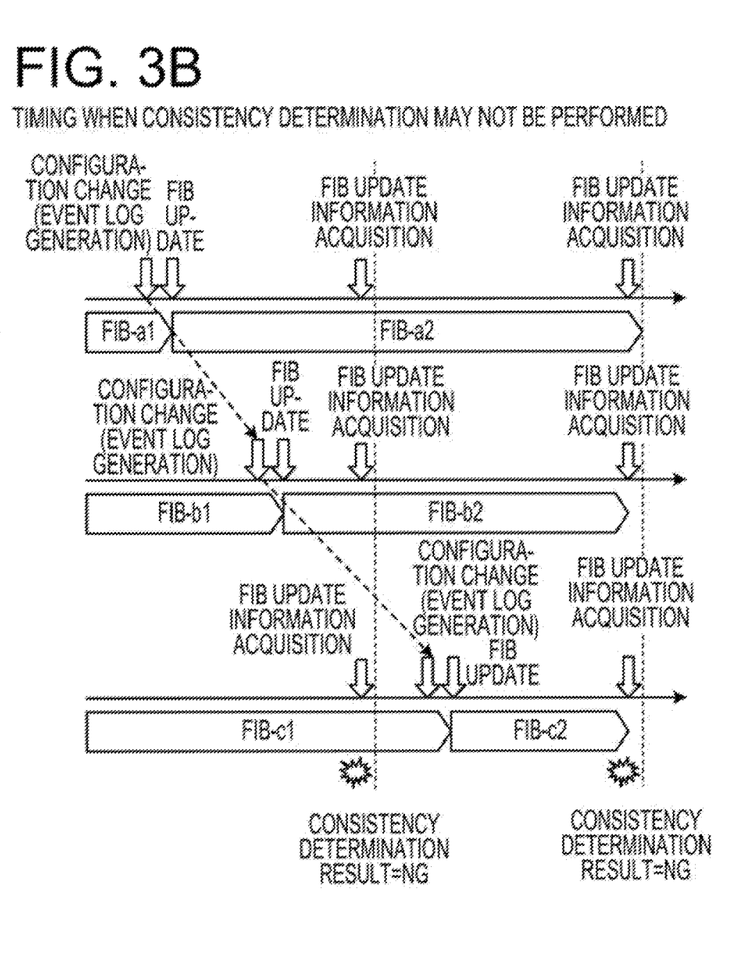

Meanwhile, the network management device 2 may not perform the consistency determination of the FIB information in a transient state where the FIB information of only a portion of relay devices has been updated. FIGS. 3A and 3B are views for explaining a timing when the consistency determination of the FIB information may not be performed. In FIGS. 3A and 3B, a node # a to a node # c are relay devices. "FIB-a1" and "FIB-a2" are FIB information of the node # a, "FIB-b1" and "FIB-b2" are FIB information of the node # b, and "FIB-c1" and "FIB-c2" are FIB information of the node # c. FIG. 3A illustrates a timing when the consistency determination may be performed, and FIG. 3B illustrates a timing when the consistency determination may not be performed.

As illustrated in FIG. 3A, when a configuration change is performed and the FIB is updated, "FIB-a1" is changed to "FIB-a2" at the node # a. "FIB-b1" is changed to "FIB-b2" at the node # b, and "FIB-c1" is changed to "FIB-c2" at the node # c. The network management device 2 periodically acquires FIB update information from all relay devices and performs the consistency determination of the FIB information. Since all FIB information pieces of the node # a to the node # c have been updated at the determination timing, the consistency determination is correctly performed and then, for example, the determination result is OK.

Meanwhile, as illustrated in FIG. 3B, since there is a difference among the relay devices in the update time of the FIB information at a timing when the network management device 2 performs the consistency determination, the FIB of the node # a and the node # b has been updated, but the FIB of the node # c has not been updated. Accordingly, the network management device 2 may not correctly perform the consistency determination. As a result, even when there is no problem in the FIB information, the determination result is NG. Therefore, the network management device 2 suspends the consistency determination until the next determination timing after the update of the FIB of the node # c.

As described above, the network management device 2 may correctly perform the consistency determination by suspending the consistency determination in a transient state where the FIB of only a portion of relay devices has been updated. After the suspension, when the consistency determination result is NG, the network management device 2 determines that there is a problem in the FIB information.

Figure 4:
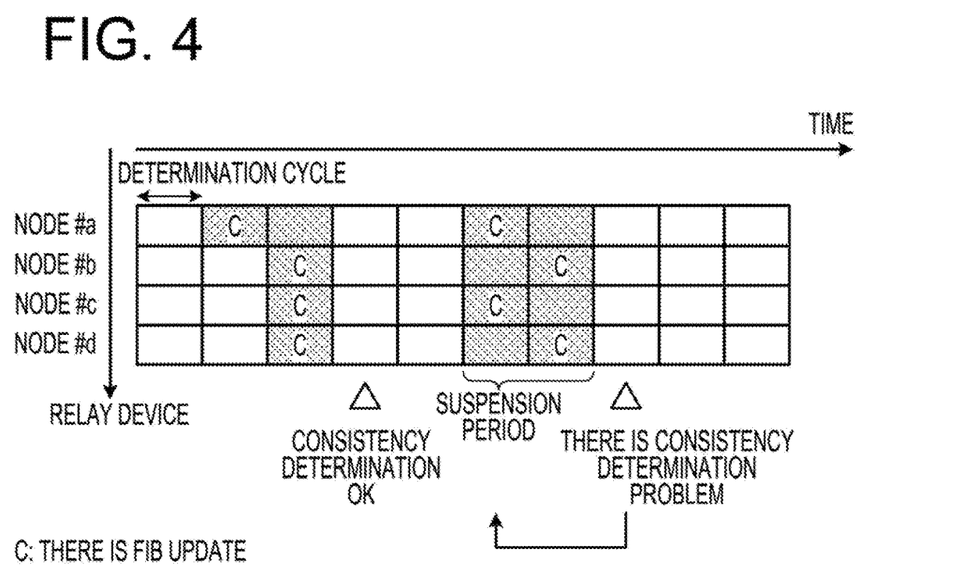
FIG. 4 is a view for explaining identifying of an event log on the basis of a suspension period.

When determining that there is a problem in the FIB information, the network management device 2 identifies a failure cause event log on the basis of the suspension period. FIG. 4 is a view for explaining identifying of an event log on the basis of the suspension period. In FIG. 4, the vertical axis indicates a relay device, and the horizontal axis indicates a time. In addition, one section in the time indicates a consistency determination cycle, and "C" indicates that FIB has been updated.

As illustrated in FIG. 4, the network management device 2 suspends the consistency determination in a transient state where the FIB of only a portion of relay devices has been updated, and performs the consistency determination when the shaded suspension period is ended. Accordingly, the network management device 2 does not identify an event log when a problem is detected by performing the consistency determination, but identifies the event log retroactively by the suspension period. Specifically, the network management device 2 identifies an event log between an update start time and an update end time of the FIB, as a failure cause event log.

Figure 5:
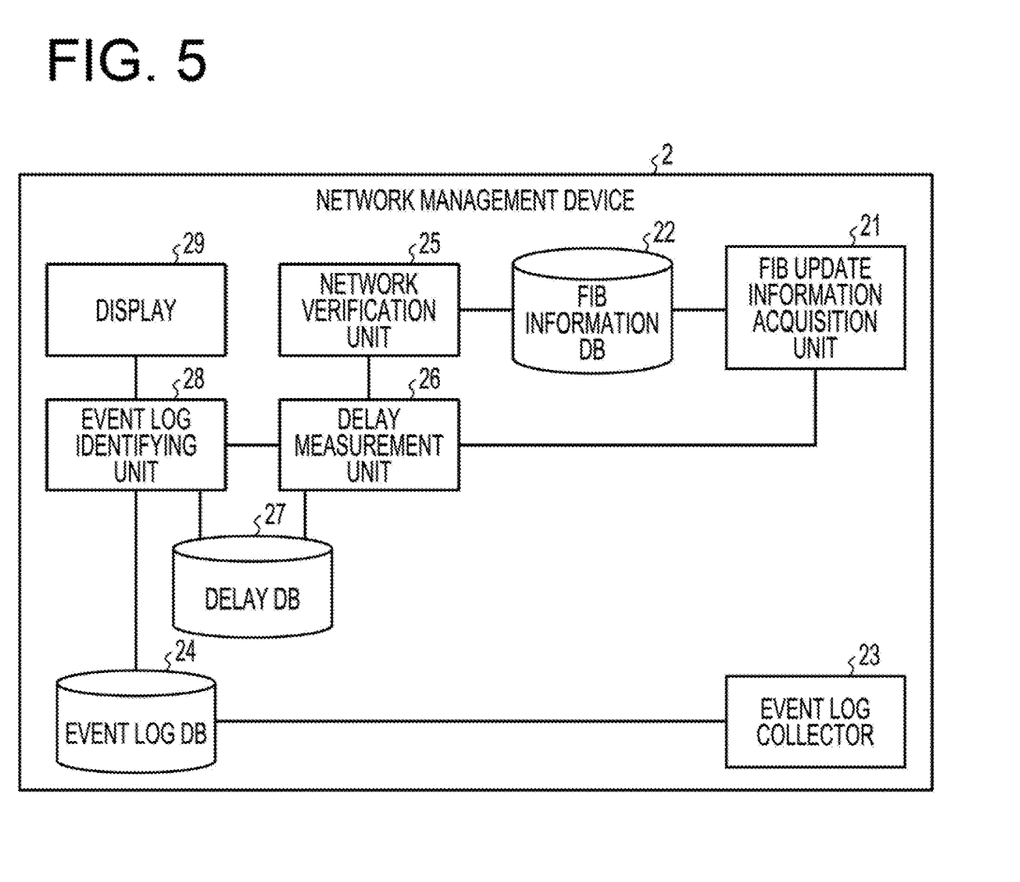
FIG. 5 is a view illustrating a functional configuration of a network management device.

Next, a functional configuration of the network management device 2 will be described. FIG. 5 is a view illustrating a functional configuration of the network management device 2. As illustrated in FIG. 5, the network management device 2 includes a FIB update information acquisition unit 21, a FIB information database (DB) 22, an event log collector 23, an event log DB 24, a network verification unit 25, a delay measurement unit 26, and a delay DB 27. The network management device 2 includes an event log identifying unit 28, and a display 29.

The FIB update information acquisition unit 21 acquires FIB update information from each relay device at an acquisition cycle of the FIB update information, that is, at a consistency determination cycle, and updates the FIB information DB 22 on the basis of the acquired FIB update information. Further, the FIB update information acquisition unit 21 notifies the delay measurement unit 26 that the FIB update information has been acquired.

Figure 6:
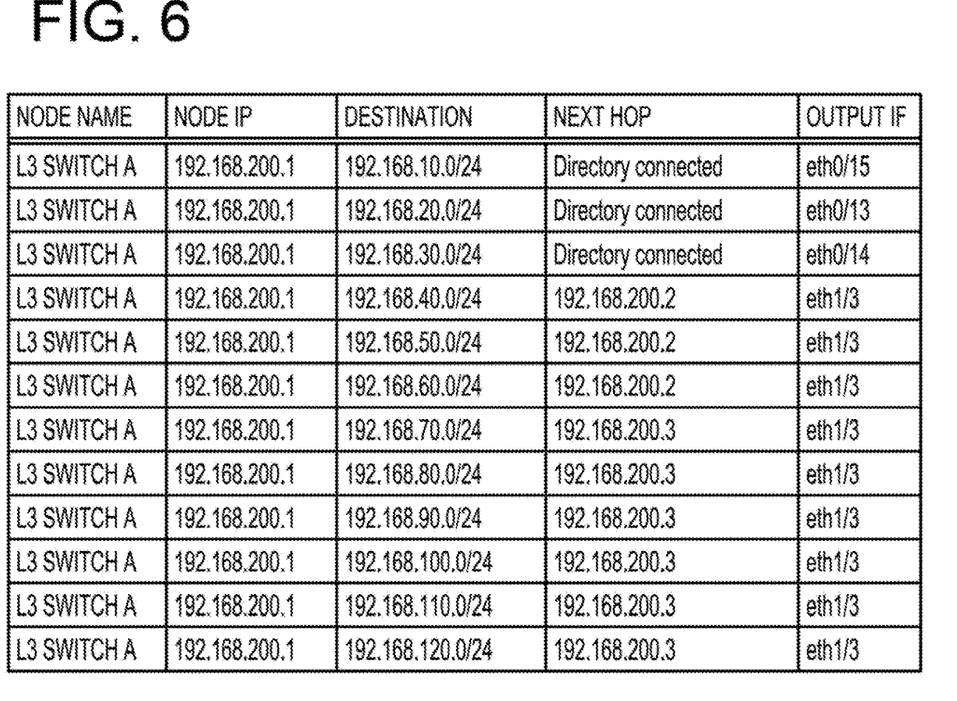
FIG. 6 is a view illustrating an example of a FIB information DB.

The FIB information DB 22 stores FIB information. FIG. 6 is a view illustrating an example of the FIB information DB 22. As illustrated in FIG. 6, the FIB information DB 22 stores a node name, a node IP (Internet Protocol), a destination, a next hop, and an output IF (interface) in association with each destination.

The node name is a name that identifies a relay device. The node IP is an IP address of a relay device. The destination is an IP address of the information processing apparatus 6 as a transmission destination of data to be relayed. The next hop is an IP address of a relay device as a forwarding destination of data having a corresponding destination. When the forwarding destination is the information processing apparatus 6 as the destination, the next hop is "Directory connected." The output IF is an identifier that identifies a port as an output destination of data, "eth" indicates an Ether port, a number before "/" indicates a slot number, and a number after "/" Indicates a port number.

FIG. 6 illustrates FIB information stored by "the L3 switch A" having an IP address of "192.168.200.1." For example, data whose transmission destination is the information processing apparatus 6 having an IP address of "192.168.10.0/24" is directly transmitted to the transmission destination from an Ether port having a slot number of "0" and a port number of "15." Further, data whose transmission destination is the information processing apparatus 6 having an IP address of "192.168.40.0/24" is transmitted to a relay device having an IP address of "192.168.200.2" from an Ether port having a slot number of "1" and a port number of "3."

The event log collector 23 collects event logs from each relay device at regular time intervals, and stores the event logs in the event log DB 24.

Figure 7:
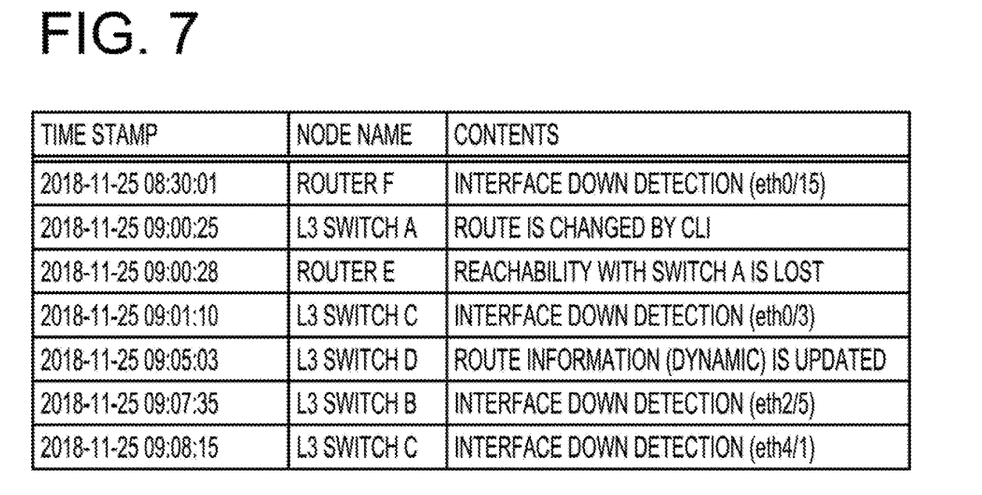
FIG. 7 is a view illustrating an example of an event log DB.

The event log DB 24 stores event logs collected from each relay device. FIG. 7 is a view illustrating an example of the event log DB 24. As illustrated in FIG. 7, the event log DB 24 stores a time stamp, a node name, and contents in association with each event log.

The time stamp is a time when an event has occurred. The node name is a name of a relay device in which an event has occurred. The contents indicate contents of an event. For example, at 08:30:01 on Nov. 25, 2018, "interface down detection (eth0/15)" has occurred in "the router F."

The network verification unit 25 determines the consistency of the FIB information stored in the FIB information DB 22 by using the technology described in U.S. patent Ser. No. 10/057,166, and transfers the determination result to the delay measurement unit 26. When determining that there is no consistency, the network verification unit 25 identifies a relay device in which the inconsistency has been detected, and transfers the name of the identified relay device to the delay measurement unit 26.

The delay measurement unit 26 instructs the network verification unit 25 to perform the consistency determination of the FIB Information at a consistency determination cycle. Meanwhile, when the FIB information has not been updated, the delay measurement unit 26 does not instruct the network verification unit 25 to perform the consistency determination of the FIB information. Further, during a suspension period, the delay measurement unit 26 does not instruct the network verification unit 25 to perform the consistency determination of the FIB information.

When the FIB information is inconsistent, the delay measurement unit 26 transfers a time when the inconsistency has been detected and a name of a relay device in which the inconsistency has been detected to the event log identifying unit 28, and instructs the event log identifying unit 28 to identify a failure cause event log.

Further, the delay measurement unit 26 stores a consistency determination time, a determination result, a FIB update information acquisition start time, a FIB update information acquisition end time, a consistency determination suspension time, and an average value of a suspension time, in the delay DB 27. When it is not possible to confirm the update of the FIB in a portion of relay devices, as a time corresponding to the average value of the suspension time passes, the delay measurement unit 26 instructs the network verification unit 25 to determine the consistency.

Figure 8:
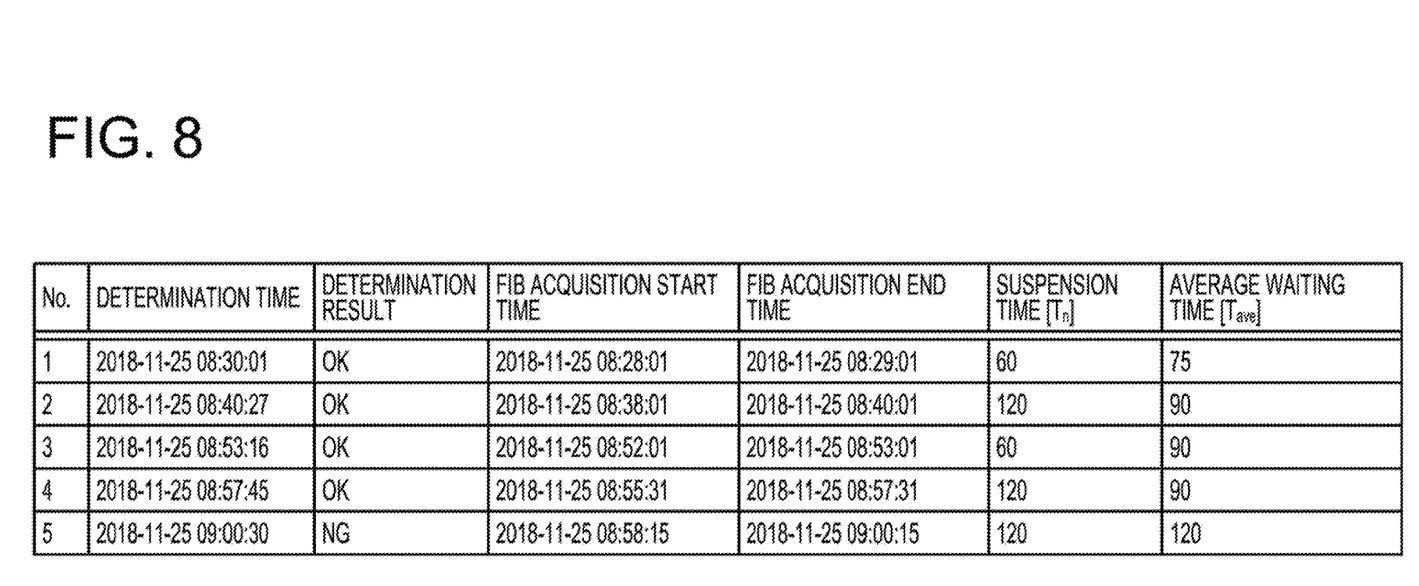
FIG. 8 is a view illustrating an example of a delay DB.

The delay DB 27 stores information on the consistency determination of the FIB information, for each determination. FIG. 8 is a view illustrating an example of the delay DB 27. As illustrated in FIG. 8, the delay DB 27 stores a number (No.), a determination time, a determination result, a FIB acquisition start time, a FIB acquisition end time, a suspension time ($T_n$), and an average waiting time ($T_{ave}$), for each consistency determination.

The "No." is a number that identifies each determination. The determination time is a time when the consistency determination was performed. The determination result is a determination result of the consistency, and is "OK" Indicating that there is consistency or "NG" Indicating that there is no consistency. The FIB acquisition start time is a time when the FIB update information acquisition started. The FIB acquisition end time is a time when the FIB update information acquisition ended.

The suspension time is a time during which the consistency determination was suspended. The average waiting time is, for example, an average value of an immediately preceding suspension time and a current suspension period, and is a waiting time until the consistency determination is performed when there is a relay device from which the FIB update information cannot be acquired.

For example, for the consistency determination identified by the number "1," the determination time is 08:30:01 on Nov. 25, 2018, and the determination result is consistency. The time when the FIB update information acquisition started is 08:28:01 on Nov. 25, 2018, and the time when the FIB update information acquisition ended is 08:29:01 on Nov. 25, 2018. The suspension time is 60 seconds, and the average waiting time is 75 seconds.

The event log identifying unit 28 receives the time when the inconsistency has been detected and the name of the relay device in which the inconsistency has been detected from the delay measurement unit 26, and identifies a failure cause event log among the event logs stored in the event log DB 24. Specifically, the event log identifying unit 28 acquires a FIB acquisition start time and a FIB acquisition end time corresponding to the time when the inconsistency has been detected, from the delay DB 27. Then, the event log identifying unit 28 identifies an event log of the relay device in which the inconsistency has been detected, as the failure cause event log, among event logs between the FIB acquisition start time and the FIB acquisition end time, and assigns a relation flag.

When the inconsistency has been detected, the display 29 displays a log indicating that the network is abnormal. In addition, when displaying the event log, the display 29 displays information indicating that the relation flag has been assigned.

Figure 9A:
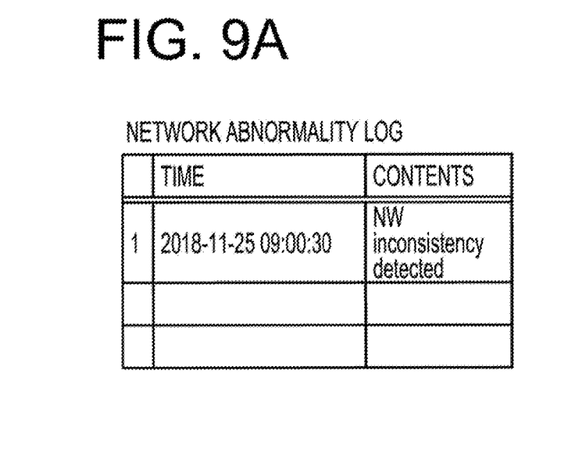
FIGS. 9A and 9B are views illustrating an example of a log screen displayed by the network management device.
Figure 9B:
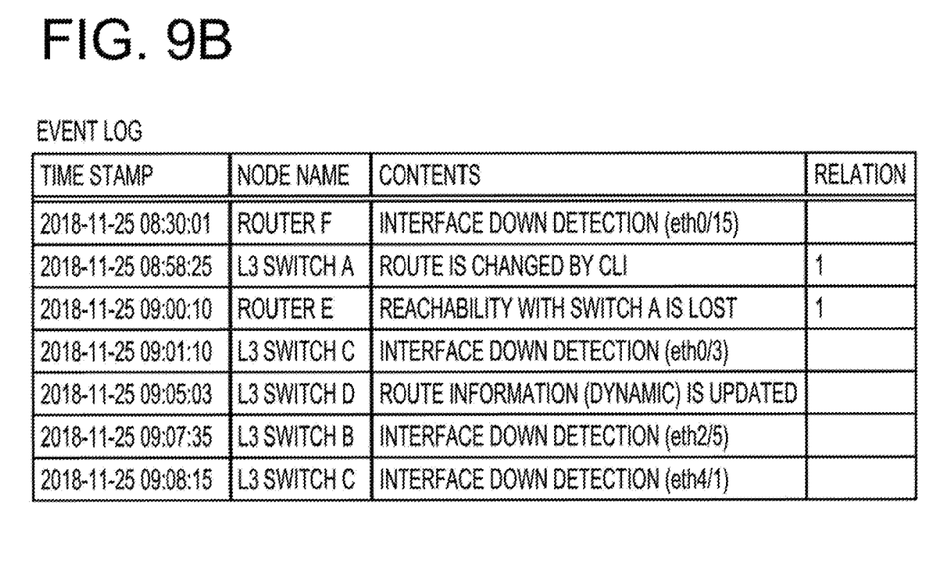

FIGS. 9A and 9B are views illustrating an example of a log screen displayed by the network management device 2. FIG. 9A illustrates an example of a network abnormality log, and FIG. 9B illustrates an example of event logs. For the network abnormality log, an abnormality occurrence time and abnormality contents are displayed. In the event logs, relation flags are assigned to the event logs identified as failure causes and displayed. In FIG. 9B, a log of an event that occurred in the L3 switch A at 08:58:25 on Nov. 25, 2018, and a log of an event that occurred in the router E at 09:00:10 on Nov. 25, 2018 are displayed as the failure cause event logs.

In addition, the display 29 may display information of the relay device in which the inconsistency has been detected and information of the event log assigned with the relation flag.

Figure 10:
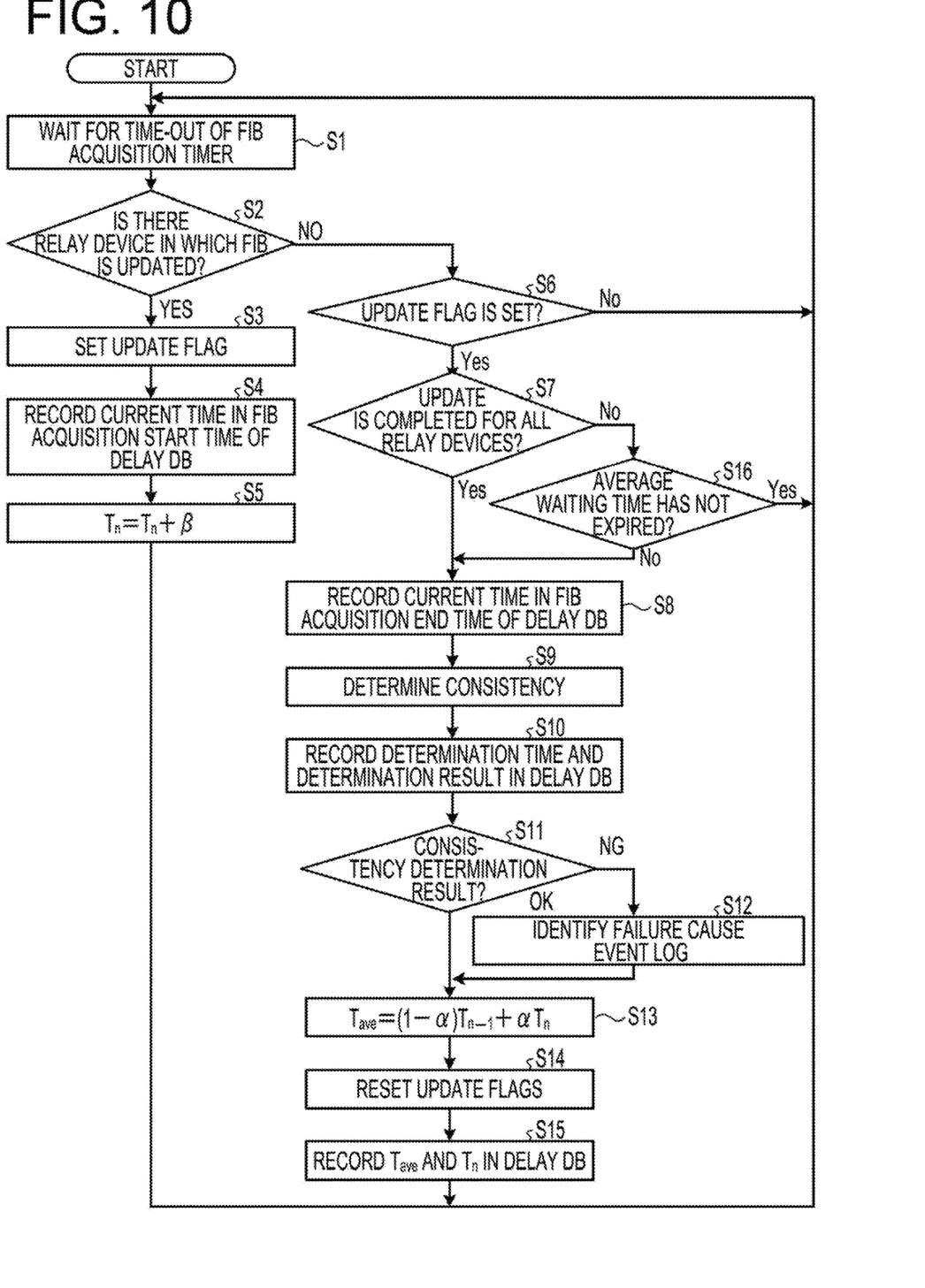
FIG. 10 is a flowchart illustrating the flow of a processing by a delay measurement unit.

Next, descriptions will be made on the flow of a processing by the delay measurement unit 26. FIG. 10 is a flowchart illustrating the flow of a processing by the delay measurement unit 26. As illustrated in FIG. 10, the delay measurement unit 26 waits for time-out of a FIB acquisition timer (step S1). Here, the FIB acquisition timer is a timer that times out at a cycle for acquiring FIB update information, that is, at a cycle of determining the consistency of FIB information.

Then, the delay measurement unit 26 determines whether there is a relay device in which FIB has been updated (step S2). When there is a relay device in which the FIB has been updated, the delay measurement unit 26 sets an update flag (step S3), and records a current time in the FIB acquisition start time of the delay DB 27 (step S4). Meanwhile, when the update flag has already been set, the delay measurement unit 26 does not perform processings in step S3 and step S4. Then, the delay measurement unit 26 adds β to $T_n$ (step S5), and returns to step S1. Here, β is a cycle of determining the consistency of the FIB information.

Meanwhile, when there is no relay device in which the FIB has been updated, the delay measurement unit 26 determines whether an update flag has been set (step S6). When the update flag has not been set, the process returns to step S1.

Meanwhile, when the update flag has been set, the delay measurement unit 26 determines whether update has been completed for all relay devices (step S7). When the update has been completed, the delay measurement unit 26 records a current time in the FIB acquisition end time of the delay DB 27 (step S8). Then, the delay measurement unit 26 instructs the network verification unit 25 to perform consistency determination (step S9), and records a determination time, and a determination result in the delay DB 27 (step S10).

Then, the delay measurement unit 26 determines the consistency determination result (step S11), and instructs the event log identifying unit 28 to identify a failure cause event log when the consistency determination result is NG (step S12).

Then, the delay measurement unit 26 calculates an average waiting time $T_{ave}=(1-\alpha)T_{n-1}+\alpha T_n$ as an average of a preceding suspension time $T_{n-1}$ and a current suspension time $T_n$ (step S13). Here, α is an integer of 0 to 1. When α=0.5, $T_{ave}$ is a simple average of $T_{n-1}$ and $T_n$. Then, the delay measurement unit 26 resets update flags (step S14), records $T_{ave}$ and $T_n$ in the delay DB 27 (step S15), and returns to step S1.

In addition, in step S7, when there is a relay device for which update has not been completed, the delay measurement unit 26 determines whether the average waiting time has not expired (step S16). When the average waiting time has not expired, the process returns to step S1, and when the average waiting time has expired, the process returns to step S8.

As described above, the delay measurement unit 26 instructs the network verification unit 25 to perform the consistency determination, and instructs the event log identifying unit 28 to identify an event log related to inconsistency. Therefore, when an abnormality has occurred in the network, the network management device 2 may identify the failure cause event log.

Figure 11:
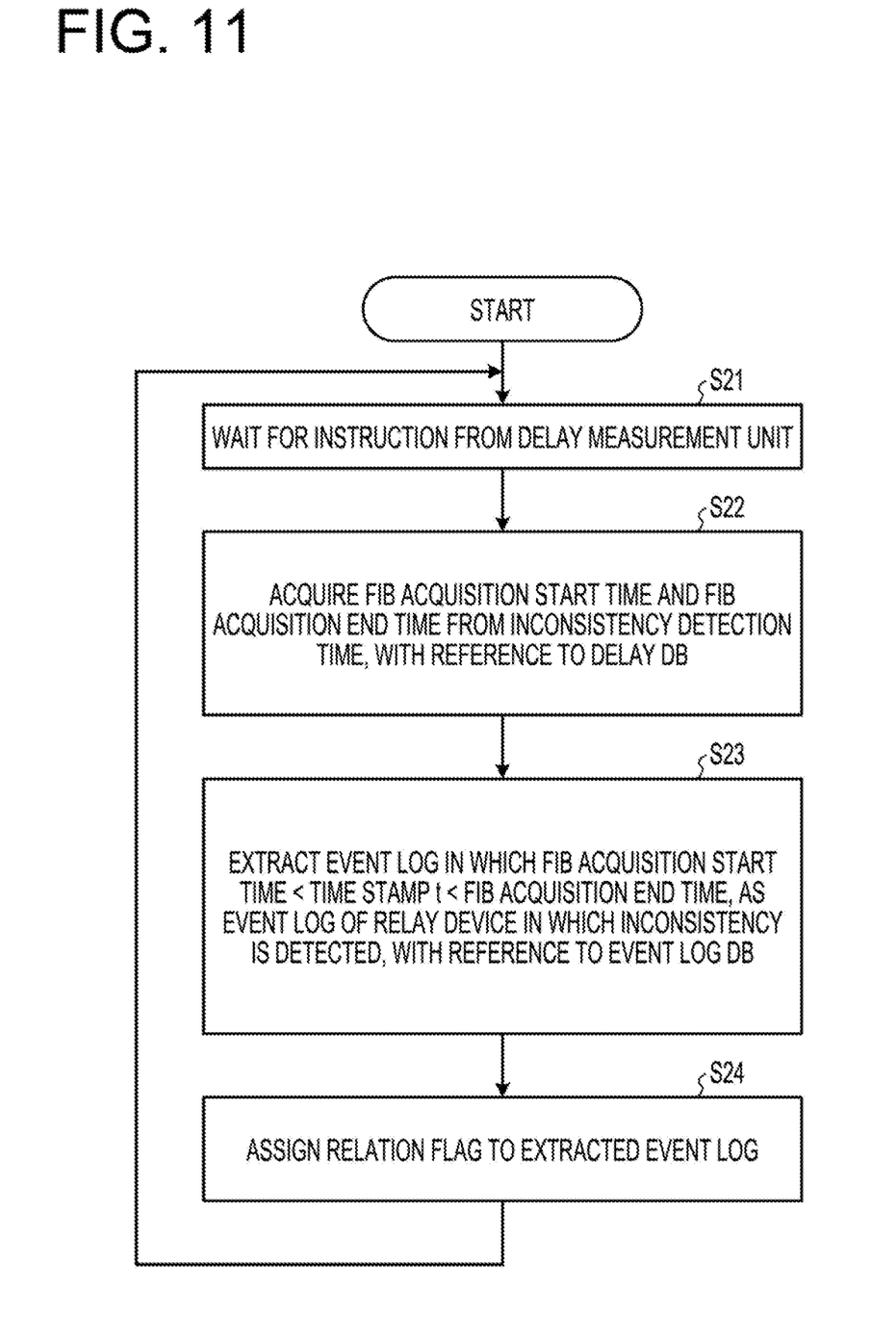
FIG. 11 is a flowchart illustrating the flow of a processing by an event log identifying unit.

Next, descriptions will be made on the flow of a processing by the event log identifying unit 28. FIG. 11 is a flowchart illustrating the flow of a processing by the event log identifying unit 28. As illustrated in FIG. 11, the event log identifying unit 28 waits for an instruction from the delay measurement unit 26 (step S21). Then, when instructed by the delay measurement unit 26 to identify an event log, the event log identifying unit 28 acquires a FIB acquisition start time and a FIB acquisition end time from an inconsistency detection time, with reference to the delay DB 27 (step S22).

Then, the event log identifying unit 28 extracts an event log in which the time stamp t is later than the FIB acquisition start time and is earlier than the FIB acquisition end time, as an event log of a relay device in which the inconsistency has been detected, with reference to the event log DB 24 (step S23). Then, the event log identifying unit 28 assigns a relation flag to the extracted event log (step S24).

As described above, since the event log identifying unit 28 extracts an event log related to the inconsistency of FIB information with reference to the delay DB 27 and the event log DB 24, the network management device 2 may identify the failure cause event log when an abnormality has occurred in the network.

As described above, in the embodiment, when confirming that the FIB update has been completed for all relay devices, the delay measurement unit 26 instructs the network verification unit 25 to perform consistency determination of FIB information. Then, when there is inconsistency in the FIB Information, the delay measurement unit 26 instructs the event log identifying unit 28 to identify a failure cause event log. The event log identifying unit 28 assigns a relation flag to an event log corresponding to a time when the FIB update information was acquired, among event logs of the relay device with inconsistency. Therefore, the network management device 2 may identify the event log assigned the relation flag as the failure cause event log.

Further, in the embodiment, when it is not possible to confirm the update of the FIB in a portion of relay devices, as an average waiting time passes, the delay measurement unit 26 instructs the network verification unit 25 to determine the consistency. This may suppress unlimited suspension of the consistency determination.

Further, in the embodiment, the delay measurement unit 26 calculates the average waiting time on the basis of a time from a FIB acquisition start time to the consistency determination, and thus the average waiting time may be set as a proper value.

Further, in the embodiment, since the event log identifying unit 28 assigns a relation flag to an event log that occurred between a FIB acquisition start time and a FIB acquisition end time, it is possible to assign the relation flag by reflecting a suspension period until the consistency determination.

Further, in the embodiment, although the network management device 2 has been described, a network management program having the similar function may be obtained by realizing the configuration the network management device 2 has, by software. Therefore, a computer that executes the network management program will be described.

Figure 12:
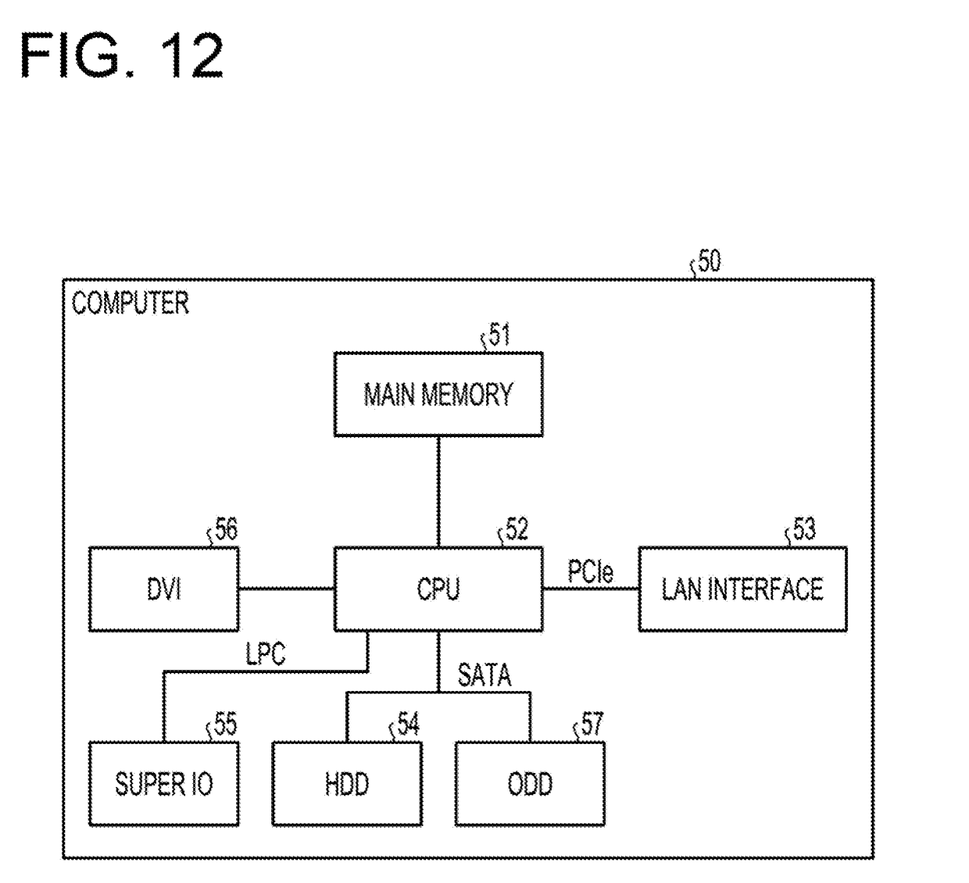
FIG. 12 is a view illustrating a hardware configuration of a computer that executes a network management program according to the embodiment.

FIG. 12 is a view illustrating a hardware configuration of a computer that executes a network management program according to the embodiment. As illustrated in FIG. 12, a computer 50 includes a main memory 51, a central processing unit (CPU) 52, a local area network (LAN) interface 53, and a hard disk drive (HDD) 54. Further, the computer 50 includes a super Input Output (IO) 55, a digital visual interface (DVI) 56, and an Optical Disk Drive (ODD) 57.

The main memory 51 is a memory that stores a program, a result during program execution, or the like. The CPU 52 is a central processing unit that reads the program from the main memory 51 and executes the program. The CPU 52 includes a chip set having a memory controller.

The LAN interface 53 is an interface for connecting the computer 50 to another computer via a LAN. The HDD 54 is a disk device that stores programs or data, and the super IO 55 is an interface for connecting input devices such as a mouse or a keyboard. The DVI 56 is an interface for connecting a liquid crystal display device, and the ODD 57 is a device that performs reading and writing of a DVD.

The LAN interface 53 is coupled to the CPU 52 by PCI express (PCIe), and the HDD 54 and the ODD 57 are coupled to the CPU 52 by serial advanced technology attachment (SATA). The super IO 55 is coupled to the CPU 52 by low pin count (LPC).

Then, the network management program executed in the computer 50 is stored in a DVD as an example of a recording medium readable by the computer 50, is read from the DVD by the ODD 57, and is installed in the computer 50. Otherwise, the network management program is stored in a database or the like of another computer system coupled via the LAN interface 53, is read from such a database, and is installed in the computer 50. Then, the installed network management program is stored in the HDD 54, is read into the main memory 51, and is executed by the CPU 52.

Further, in the embodiment, although descriptions have been made on a case where the L3 switch 3 and the router 4 are included, the network system 1 may include other relay devices. Further, in the embodiment, although descriptions have been made on a case where FIB is updated, the relay device may update another forwarding table.

According to an aspect of the embodiments, it is possible to identify a failure cause log in a network failure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   acquiring update information of forwarding tables and event logs for respective relay devices at predetermined intervals;
   performing consistency determination of determining consistency of the forwarding tables when update completion of the forwarding tables have been confirmed for all of the relay devices;
   when a first relay device is determined to have a problem in consistency, identifying an event log at a timing, among the event logs of the first relay device, corresponding to a time when update information of a first forwarding table of the first relay device is acquired as a failure cause event log; and
   outputting information including the first relay device and the identified event log.

2. The non-transitory computer-readable recording medium according to claim 1, the process further comprising:
   performing, when there are a relay device for which update completion of a forwarding table has been confirmed and a relay device for which update completion of a forwarding table has not been confirmed, the consistency determination after a predetermined waiting time passes.

3. The non-transitory computer-readable recording medium according to claim 2, wherein the waiting time is determined based on a time between a start time of the acquisition of the update information of the forwarding tables and the consistency determination.

4. The non-transitory computer-readable recording medium according to claim 1, the process further comprising:
identifying an event log between a start time and an end time of the acquisition of the update information of the forwarding tables as the failure cause event log.

5. An abnormality detection method, comprising:
acquiring, by a computer, update information of forwarding tables and event logs for respective relay devices at predetermined intervals;
performing consistency determination of determining consistency of the forwarding tables when update completion of the forwarding tables have been confirmed for all of the relay devices;
when a first relay device is determined to have a problem in consistency, identifying an event log at a timing, among the event logs of the first relay device, corresponding to a time when update information of a first forwarding table of the first relay device is acquired as a failure cause event log; and
outputting information including the first relay device and the identified event log.

6. An abnormality detection device, comprising:
a memory; and
a processor coupled to the memory and the processor configured to:
acquire update information of forwarding tables and event logs for respective relay devices at predetermined intervals;
perform consistency determination of determining consistency of the forwarding tables when update completion of the forwarding tables have been confirmed for all of the relay devices;
when a first relay device is determined to have a problem in consistency, identify an event log at a timing, among the event logs of the first relay device, corresponding to a time when update information of a first forwarding table of the first relay device is acquired as a failure cause event log; and
output information including the first relay device and the identified event log.

* * * * *